US006238121B1

(12) United States Patent
Röser

(10) Patent No.: US 6,238,121 B1
(45) Date of Patent: May 29, 2001

(54) PROCESS AND FASTENING MEMBER FOR FORMING A FRICTION-WELDED JOINT

(75) Inventor: Hermann Röser, Hampden, CT (US)

(73) Assignee: Emhart Inc., Newark, DE (US)

( * ) Notice: Subject to any disclaimer, the term of this patent is extended or adjusted under 35 U.S.C. 154(b) by 0 days.

(21) Appl. No.: 09/456,029

(22) Filed: Dec. 3, 1999

Related U.S. Application Data

(63) Continuation of application No. PCT/IB98/00846, filed on Jun. 2, 1998.

(30) Foreign Application Priority Data

Jun. 10, 1997 (DE) .............................................. 197 24 448
Jan. 22, 1998 (DE) .............................................. 198 02 393

(51) Int. Cl.$^7$ .................................................. B23K 20/12
(52) U.S. Cl. ........................... 403/13; 403/271; 403/282; 228/114.5
(58) Field of Search .................................. 403/270, 271, 403/272, 282, 13, 14; 228/114.5, 112.1, 2.3

(56) References Cited

U.S. PATENT DOCUMENTS

| 2,563,107 | * | 8/1951 | Fanger | 403/271 X |
| 3,477,115 | * | 11/1969 | Martin et al. | 228/114.5 |
| 3,824,145 | * | 7/1974 | Flax | 228/2.3 |
| 3,891,332 | * | 6/1975 | Molyneux et al. | 403/13 |
| 4,676,707 | * | 6/1987 | Cearlock et al. | 411/510 |
| 4,824,304 | * | 4/1989 | Shibayama et al. | 411/171 |
| 4,850,772 | * | 7/1989 | Jenkins | 228/2.3 X |
| 5,054,980 | * | 10/1991 | Bidefeld | 403/271 X |
| 5,469,617 | * | 11/1995 | Thomas et al. | 228/114.5 X |
| 5,713,706 | * | 2/1998 | Lozano | 411/171 |
| 5,879,206 | * | 3/1999 | Badgley et al. | 228/114.5 X |
| 5,979,742 | * | 11/1999 | Enomoto et al. | 228/112.1 |

* cited by examiner

Primary Examiner—Lynne H. Browne
Assistant Examiner—John R. Cottingham
(74) Attorney, Agent, or Firm—Edward D. Murphy

(57) ABSTRACT

The invention relates to a process for forming a friction-welded joint between a first (10) and a second (50) metallic component, in particular a friction-welded joint between a function-welding stud and a metal plate, wherein a guide element (1) of the first component (10) is introduced into a positioning bore (53) extending substantially perpendicularly to a surface (55) of the second component (50) until a welding face (2) of the first component (10) comes into contact with the surface (55) round the positioning bore (53) and wherein the two components (10; 50) are rotated relative to one another round an axis of rotation in the longitudinal direction of the guide element (1) such that an annular joint region is produced between the two components (10; 50). The invention also relates to a metallic fastening member (10) for forming such a friction-welded joint. The positioning bore (53) and the guide element (1) allow a friction-welded joint to be formed exactly at a predetermined point. The friction welding of metallic components is at the same time substantially simplified.

2 Claims, 4 Drawing Sheets

PROCESS AND FASTENING MEMBER FOR FORMING A FRICTION-WELDED JOINT

This application is a continuation of pending International Application No. PCT/IB98/00846, filed on Jun. 2, 1998, entitled "Process and Fastening Member for Forming a Friction-Welded Joint".

BACKGROUND OF THE INVENTION

The present invention relates to the formation of a friction-welded joint between a first and a second metallic component, in particular a friction-welded joint between a friction-welded stud and a metal plate.

DE 42 25 435 A1 discloses a process for forming a friction-welded joint and a driving mandrel with which the function-welded joint can be produced in the interior of a tubular component. The driving mandrel with its conically tapering end is driven home in the tubular component and is rotated round an axis of symmetry. The end of the tubular component expands and adapts itself to the conical shape of the driving mandrel. A joint region is created on the cone surface. The joint is reinforced by frictional contact between the driving mandrel and the component.

SUMMARY OF THE PRESENT INVENTION

It is an object of the present invention to provide a process for forming a friction-welded joint between a first and a second metallic component, with which an annular joint region can be produced at a predetermined position. A further object is to provide a metallic fastening member for forming a friction-welded joint at a predetermined point of a different component.

The invention provides a process for forming a friction-welded joint between a first and a second metallic component, in particular a friction-welded joint between a metal stud and a metal plate, wherein a guide element of the first component is introduced into a positioning bore extending substantially perpendicularly to a surface of the second component and the two components are rotated relative to one another round an axis of rotation extending in the longitudinal direction of the guide element such that an annular joint region is produced between the two components.

A metallic fastening member for forming a friction-welded joint, the member comprising a stud with an outer cylindrical surface and a central projection extending axially beyond the confines of the surface, the member configured to include a continuous annular flange radially spaced from the central projection, the flange defining a continuous welding face which is oriented substantially in an assembly direction, which direction is perpendicular to a plane formed by the surface of the welding face.

Process for forming a friction-welded joint between a first and a second metallic component, the first component comprising a stud having a central projection surrounded by and radially space from a continuous annular flange, wherein the central projection of the stud is introduced into a positioning bore within the second component, the bore extending substantially perpendicularly to a surface of the second component, and wherein the first and second components are rotated relative to each other about an axis defined by the central projection, such that an annular joint region is formed between the continuous flange and the surface of the second component.

In an embodiment of a friction-welded joint, high contact pressures or relatively high speeds of rotation can occur. Therefore, there is always the risk that the components which are rotating relative to one another will run off center. This is avoided with the process according to the invention because the interplay between the guide element and the positioning bore prevents a deviation from the proposed joint position. The process control according to the invention also reduces expenditure on apparatus when producing the friction-welded joint if the correct relative positioning of the two components is achieved by the components themselves. In particular, high forces which act transversely to the axis of rotation and could damage, for example, bearings of a device with which one of the two components is rotated round an axis of rotation, are avoided. With known processes, high bearing forces occur if the axis of rotation is not orientated perpendicular to the surface of the second component.

The process control according to the invention is particularly advantageous with an aluminum/steel pairing of material as, for forming a friction-welded joint, an aluminum oxide layer on a welding face of an aluminum component first has to be rubbed away before a material joint is created between the two components. The aluminum oxide layer can be rubbed away in this way by high contact pressures and rapid relative movements between the two components. This can also be achieved if the welding face, for example of the first component comprising the guide element, has a surface structure by means of which the coefficient of friction between the mutually rubbing faces is increased.

With the process according to the invention, it is also proposed that the guide element be introduced into the positioning bore until a welding face of the first component comes into contact with the surface of the second component round the positioning bore.

The components are, in particular, a metal stud with a guide element and a metal plate with a positioning bore. The term welding face denotes a region of a surface which is rubbed when carrying out the process or with which a welding face of the other respective component is rubbed. The shape of the welding face can change significantly while carrying out the process. In particular, the material can be liquefied at the welding face owing to frictional heat. On completion of friction welding, the joint region, i.e. the material joint between the components, exists in the region of the welding face or former welding face.

The process according to the invention also allows the first component with its guide element initially to be positioned correctly on the second component, the guide element being introduced into the positioning bore. The components to be joined are then rotated relative to one another. According to a further advantageous idea, it is proposed that the guide element be introduced into the positioning bore during a rotating procedure. The guide element can be introduced into the positioning bore at a lower speed of rotation. This method of process control results in a higher speed as the positioning procedure is integrated into the rotating procedure.

Since the first component has a guide element comprising a free end designed as a drilling tip, it is possible to form the positioning bore by the guide element itself during the rotating procedure. The first component therefore has an automatic perforating effect, so that it is not necessary to form the positioning bore in advance.

In a development of the process, the guide element is introduced further into the positioning bore during the process of rotation. A contact pressure on the welding face required for the welding procedure can therefore be achieved or maintained although material on the welding face of the surface of the second component is deformed.

In a further development, a free end of the guide element is inserted through the positioning bore designed as a through-bore. The available bore length is therefore utilized completely. For the same reason, the attainment of positioning which is as stable as possible, the external dimensions of the guide element and the internal diameter of the positioning bore are adapted as accurately as possible to one another, the frictional resistance between the guide element and the wall of the positioning bore remaining as low as possible. In an alternative development, sufficiently strong friction occurs between the guide element and the wall of the positioning bore so a joint region is also produced there.

To form a joint region between the guide element and the wall of the positioning bore, it is also proposed that the guide element should have at least one portion tapering in the assembly direction, preferably a conically tapering portion. The conically tapering portion can partially form a friction-welded joint with the wall of the positioning bore. The guide element is also automatically centered in a prefabricated positioning bore by the tapering portion of the guide element.

In an embodiment of the process, the shape and/or the dimensions and/or the material of the components are selected such that the material essentially of only one of the two components deforms during production of the joint region. In a preferred embodiment, this is achieved in that the welding face of the first component is located on an end face of a thin-walled projection. Therefore, any frictional heat produced can only be carried slowly from the face end via the projection so the material rapidly achieves adequately high temperatures for forming a material joint.

The metallic fastening member according to the invention for forming a friction-welded joint has a surface comprising at least one welding face which is orientated substantially in an assembly direction and surrounds the axis of rotation while extending along a plane perpendicular to an axis of rotation. The fastening member comprises a guide element which extends along the axis of rotation in the assembly direction. The term assembly direction denotes a direction parallel to the axis of rotation or on the axis of rotation into which an observed region of the fastening member can be moved in order to bring the welding face into contact with a welding face on another component or from which the other component can be moved toward the welding face. The term axis of rotation denotes an axis round which the fastening member can be rotated so as to produce a friction-welded joint on the welding face. The guide element is preferably a peg which extends from a base body of the fastening member along the axis of rotation.

A design of the fastening member in which the guide element projects from the plane in the assembly direction is preferred. It is therefore possible, in particular, to weld the fastening member by the process according to the invention to a metal plate comprising a positioning bore which extends perpendicularly to its surface.

In a development of the fastening member, the welding face annularly surrounds the axis of rotation. There are embodiments in which the welding face consists of a plurality of mutually spaced partial faces. However, embodiments with an uninterrupted welding face, in particular a welding face which surrounds the axis of rotation right rounds are preferred. An advantage of such embodiments is that the fastening members can easily be produced, for example in a press.

In a development, the fastening member has approximately its greatest perimeter at the outer edge of the welding face. A joint region with a maximum perimeter can therefore be achieved so a particularly stable friction-welded joint can be obtained.

If the second component is a metal plate, the thickness of the metal plate should be taken into consideration when selecting the size of the welding face. Above a specific size of the welding face, the material joint between the two components has a stability which is greater than the stability of the metal plate. It should also be noted that the contact pressure required for producing the friction-welded joint is roughly proportional to the size of the welding face. The metal plate should therefore be supported in a suitable manner. For this reason, and also in order to limit the expenditure on apparatus, welding faces which are as small as possible are preferred.

In a further development, the internal width of the annular welding face is greater than the thickness of the guide element. The internal width is measured along a portion intersecting the axis of rotation. In the case of a non-circular welding face, the term internal width denotes the smallest internal width. The guide element is therefore surrounded by a free space into which plastically deformed material can escape during the production of a friction-welded joint, so a pedestal-like widened region can be formed inwardly. At the end of a friction-welding procedure, the space leads to advantageous rapid cooling of materials previously heated by friction in the region of the welding faces and therefore to a particularly stable friction-welded joint. The large cooling surface also plays a part in addition to the possible escape of molten material. In order further to accelerate cooling at the internal edge of the welding face, it is proposed that compressed air be allowed to flow into this region, for example through a gap remaining between the guide element and a positioning bore into which the guide element has been introduced.

In a development of the fastening member according to the invention, the welding face extends roughly concentrically to a peripheral line of the guide element. The advantages, in terms of production, of a rotationally symmetrical design of the fastening member have already been mentioned. However, there are also advantages in terms of the process when producing a friction-welded joint as the fastening member can be rotated particularly easily and effectively round an axis of rotation extending through the center of the welding face or the guide element.

In a further embodiment, the welding face rests on a projection of the fastening member. The projection is preferably thin-walled so the welding face is small and a slight pressing force is sufficient to produce a friction-welded joint to another component.

It is also advantageous if the guide element has a cylindrical peripheral surface. The external diameter is preferably adapted to the internal diameter of a positioning bore in a component to which a friction-welded joint is to be produced.

According to a further advantageous embodiment of the fastening member, it is proposed that the guide element have at least one portion tapering in the assembly direction. The guide element is automatically centered if it is introduced into a prefabricated positioning bore. The tapering portion is preferably conical in design and it is preferably located in the free end region of the guide element.

In one embodiment of the fastening member, the guide element is so formed that the free end of the guide element is formed as a drilling tip. This design of the guide element allows a positioning bore to be formed by the guide element. Automatic perforation is thus effected by the fastening member. The drilling tip is preferably formed with at least one cutting edge. The design of the drilling tip can be adapted to the material properties of the component on which the fastening member is to be arranged.

In one embodiment of the fastening member, the welding face has surface structures preferably extending substantially perpendicularly to the axis of rotation. The coefficient of friction of the welding face can be adjusted through the shape and dimensions of the surface structures.

BRIEF DESCRIPTION OF THE ACCOMPANYING DRAWINGS

Embodiments of the process according to the invention and of the fastening member according to the invention will be described with reference to the drawings. However, the invention is not limited to these embodiments.

DETAILED DESCRIPTION OF THE PREFERRED EMBODIMENT

Figure 1:
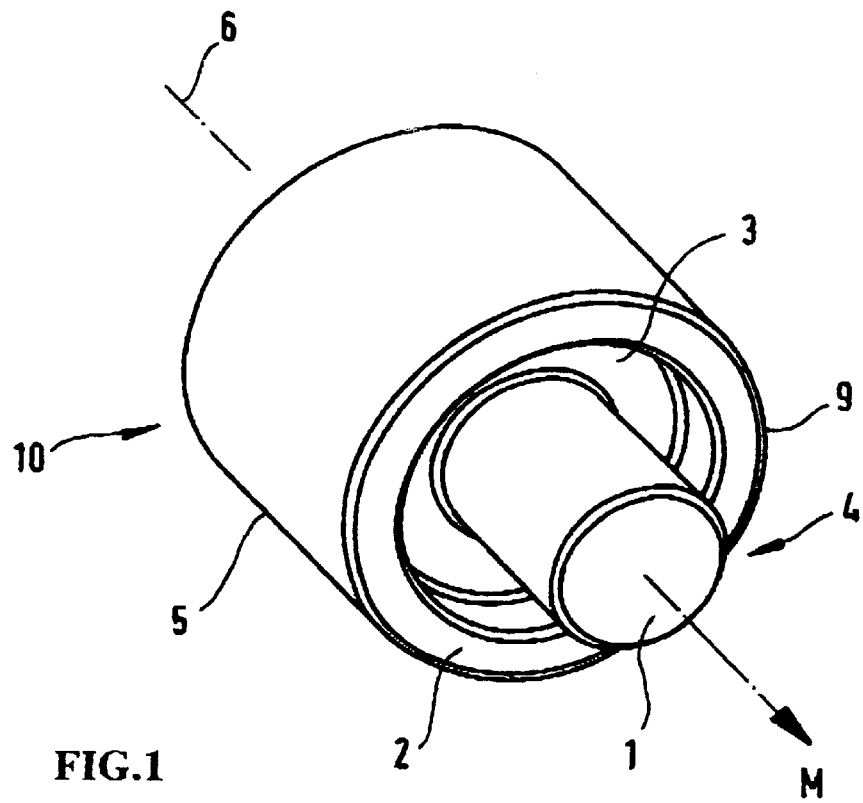
FIG. 1 is a perspective view of a first embodiment of the fastening member according to the invention.
Figure 2:
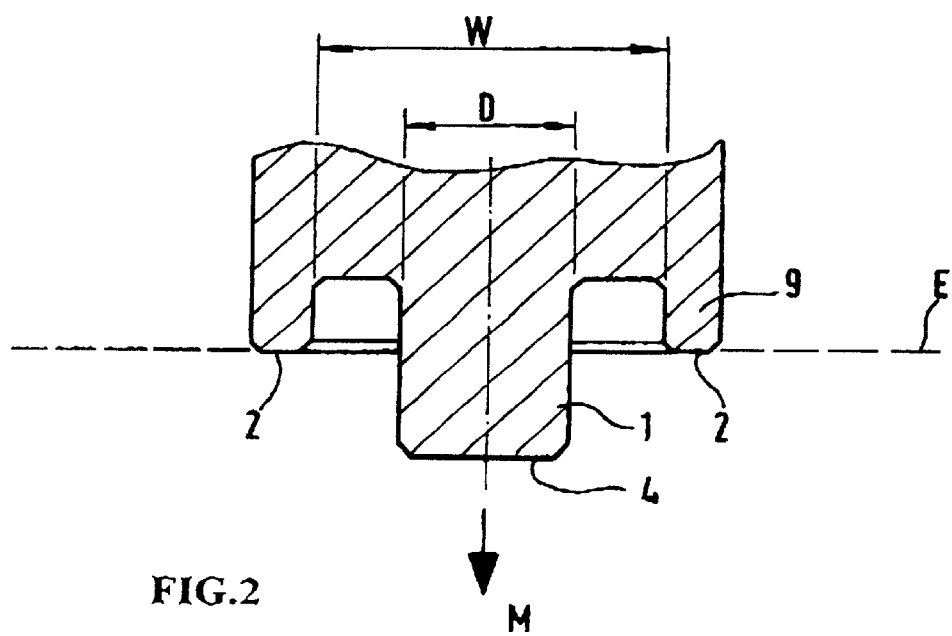
FIG. 2 is a longitudinal section through the fastening member according to FIG. 1.

FIGS. 1 and 2 show a fastening member 10 according to the invention, in particular a friction-welding stud, with an annular welding face 2 orientated in an assembly direction M. The welding face 2 rests on the face end of a projection 9 of the fastening member 10 and surrounds an axis of rotation 6 all round. Together with the base body of the fastening member 10, the projection 9 forms a cylindrical part of the surface 5. From the base body of the fastening member 10, a guide element 1 designed as a peg extends along the axis of rotation 6 in the assembly direction M toward its free end 4. The guide element 1 projects from a plane E in which the welding face 2 is located.

Between the cylindrical guide element 1 and the annular projection 9 there is a closed peripheral groove 3 into which material heated by friction during the friction welding of the fastening member 10 can escape. To permit rapid cooling of the material at the end of the welding procedure, the diameter D of the guide element 1 is roughly half the size of the internal width W of the welding face 2. For reasons of production and processing, the edges at the face end of the projection 9 and the free end 4 of the guide element 1 are beveled. The bevels on the projection 9 allow heated liquid material to be drawn off during the welding process due to forces of adhesion. The bevel on the guide element 1 allows the guide element 1 to be introduced into a positioning bore easily. In a further embodiment, shown in FIG. 5, bevel is much more pronounced so the guide element 71 has a conically tapering portion 8.

Figure 3:
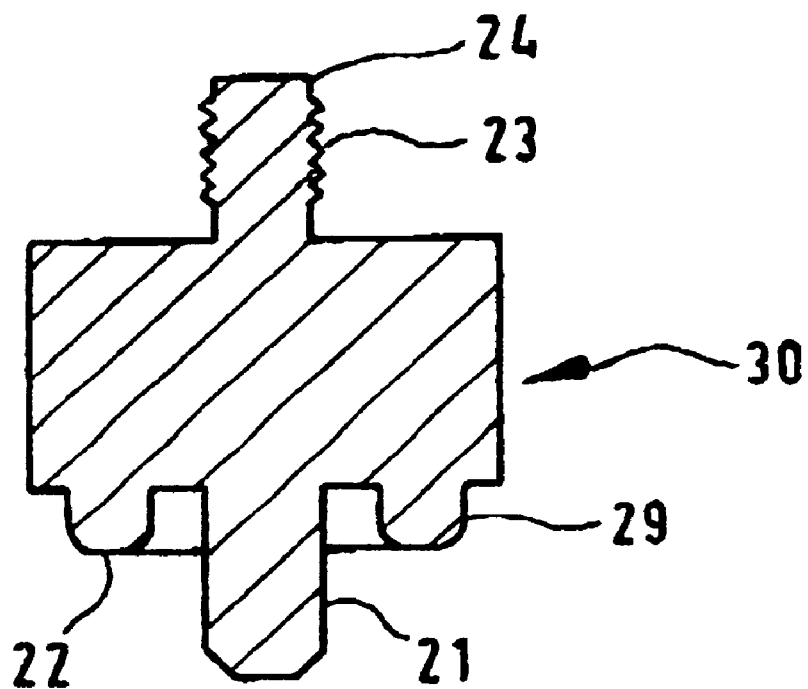
FIG. 3 is a longitudinal section through a second embodiment of the fastening member according to the invention.

The fastening member 30 shown in FIG. 3 has a bead-like annular projection 29 on whose face end the welding face 22 rests. A fastening extension 24 with an external thread 23 on the outer periphery is formed opposite a guide element 21. The fastening extension 24 allows components with a corresponding internal thread to be screwed on.

Figure 4:
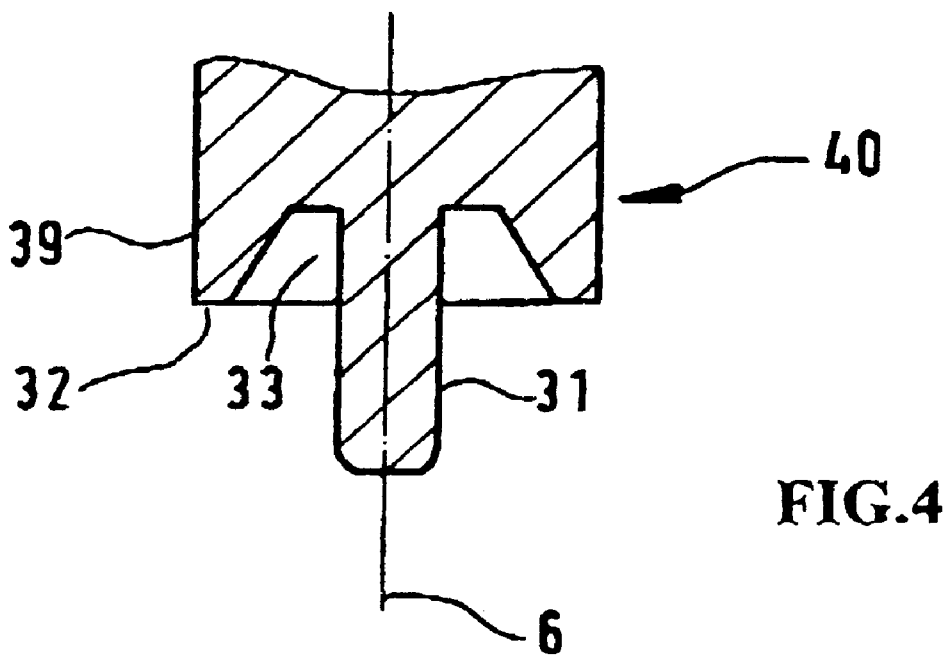
FIG. 4 is a longitudinal section through part of a third embodiment of the fastening member according to the invention.

FIG. 4 shows part of a further embodiment of the fastening member 40 according to the invention. A groove 33 between guide element 31 and an annular projection 39 of the fastening member 40 has a cross-sectional area which diminishes steadily toward the top. The cross-sectional area of the projection 39 therefore increases continuously as viewed from the terminal welding face 32. For this reason, uncontrolled melting of the projection 39 is prevented when welding on the fastening member 40 as the cross-sectional area and therefore the discharge of heat by upward heat conduction increases as melting progresses.

Figure 5:
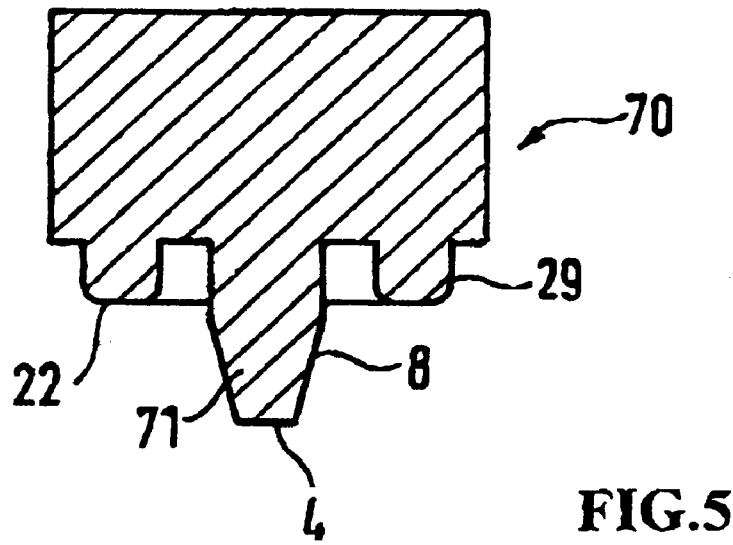
FIG. 5 is a longitudinal section through part of a fourth embodiment of the fastening member according to the invention.

FIG. 5 shows a further embodiment of a fastening member 70 according to the invention. The fastening member 70 comprises a guide element 71. The basic construction of the fastening member 70 substantially corresponds to the design of the fastening member 30. The guide element 71 has a conically tapering portion 8. The portion 8 tapers toward the free end 4 of the guide element 71.

Figure 6:
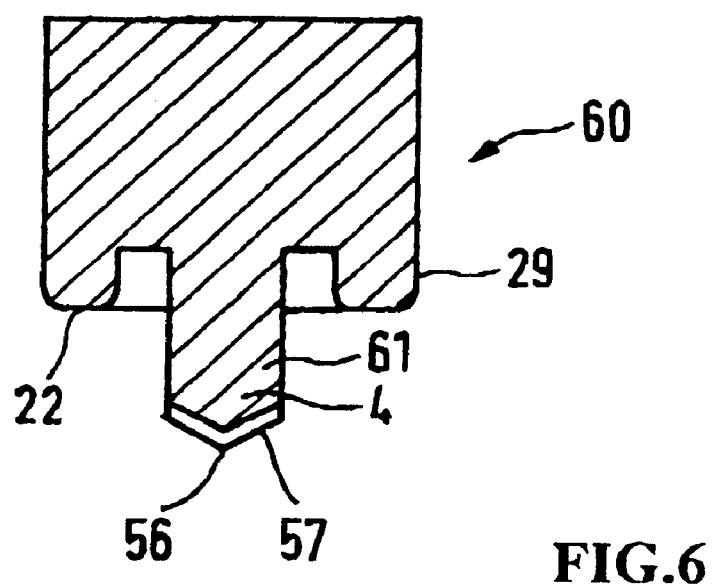
FIG. 6 is a longitudinal section through part of a fifth embodiment of the fastening member according to the invention.
Figure 10:
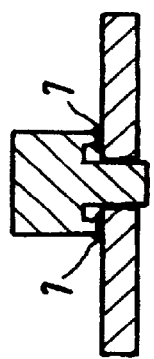
FIGS. 7 to 10 show process steps during the friction welding of a fastening member according to FIG. 1 to a metal plate.
Figure 9:
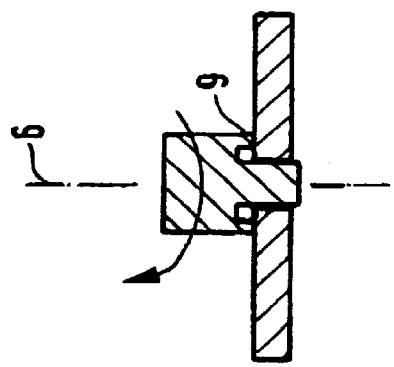
Figure 8:
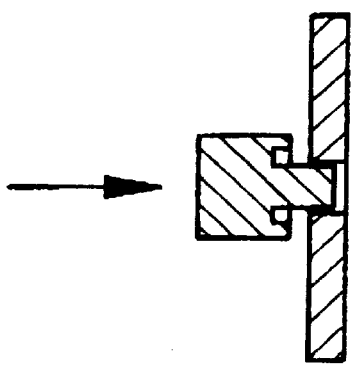
Figure 7:
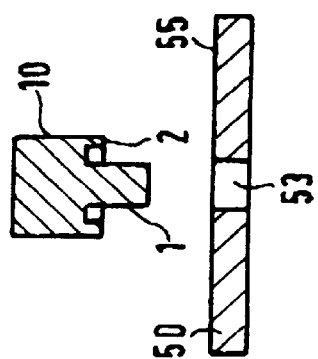

FIG. 6 shows a further embodiment of the fasting member 60 according to the invention. The fastening member 60 has a guide element 61 comprising a free end 4 designed in the form of a drilling tip 56. The drilling tip 56 comprises at least one cutting edge 57. The fastening member 60 can have an automatic perforating effect owing to the design of the guide element 61 with a drilling tip 56.

An embodiment of the process according to the invention is described with reference to FIGS. 7 to 10. A guide element 1 of the fastening member 10 is introduced into a throughbore 53 in a metal plate 50 until the weld fuse 2 comes into contact with the surface 55 of the metal plate 50.

The actual friction welding procedure is commenced by rotating the fastening member 10 in the direction of the arrow round the axis of rotation 6 (FIG. 9) Substantially only the material of the projection 9 is deformed as the projection 9, on whose terminal end the welding face 2 rests has a thin wall. The material of the metal plate 50 is merely melted in a thin superficial layer. The molten material is cooled rapidly by rapid deceleration of the rotational movement and solidifies to an annular joint region 7.

The invention allows the positionally correct formation of a friction-welded joint between two metallic components at a predetermined point. A reliable friction-welded joint is produced by forming an annular joint region between the two components.

What is claimed is:

1. A friction welded assembly comprising:
   a. a fastening member having a lower end with a central projection extending a predetermined distance from the bottom thereof and an annular face formed at the bottom radially outwardly from the central projection in spaced relation thereto;
   b. an annular recess extending upwardly from the bottom and formed in the space between the annular face and the central projection;
   c. a plate member of predetermined thickness that is less than the length of the central projection of the fastening member;

d. a hole formed in the plate member adopted to receive the central projection of the fastening member in a close-fitting and stable manner, and with the central projection projecting outwardly therefrom;

e. an axis formed at the center of the hole in the plate member with the central projection lying in the axis;

f. the fastening member positioned upon the plate member by the central projection engagement in the hole in the plate member; and g. the fastening member rotated along the axis for a predetermined time to form a friction weld at the annular face to fasten fastening member to the plate member.

2. The combination claimed in claim 1, wherein:

a. the recess of the fastening member to partially fill up with excess weld material upon the friction weld being formed between the fastening member and the plate member.

\* \* \* \* \*